United States Patent
Chou et al.

(10) Patent No.: US 10,632,382 B2
(45) Date of Patent: Apr. 28, 2020

(54) AI-ASSISTED OPERATING SYSTEM

(71) Applicant: Primax Electronics Ltd., Taipei (TW)

(72) Inventors: Hsiu-Hung Chou, Taipei (TW);
Yu-Chiang Lin, Taipei (TW);
Cheng-Chih Hsieh, Taipei (TW);
Hsin-Ju Teng, Taipei (TW); Ting-Yu Liu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/144,806

(22) Filed: Sep. 27, 2018

(65) Prior Publication Data

US 2019/0270014 A1    Sep. 5, 2019

Related U.S. Application Data

(60) Provisional application No. 62/637,252, filed on Mar. 1, 2018.

(51) Int. Cl.
| | |
|---|---|
| *A63F 13/45* | (2014.01) |
| *A63F 13/533* | (2014.01) |
| *A63F 13/28* | (2014.01) |
| *G06F 3/01* | (2006.01) |
| *G06F 3/0354* | (2013.01) |
| *G06F 3/039* | (2013.01) |
| *A63F 13/67* | (2014.01) |

(52) U.S. Cl.
CPC ............ *A63F 13/533* (2014.09); *A63F 13/28* (2014.09); *A63F 13/67* (2014.09); *G06F 3/016* (2013.01); *G06F 3/0395* (2013.01); *G06F 3/03543* (2013.01); *A63F 2300/6027* (2013.01)

(58) Field of Classification Search
CPC ............... A63F 13/45; A63F 2300/105; A63F 2300/8082
See application file for complete search history.

(56) References Cited

U.S. PATENT DOCUMENTS

2013/0316772 A1*  11/2013  Kong ................... A63F 13/005
                                                          463/3
2018/0001206 A1*  1/2018  Osman ................. A63F 13/335

* cited by examiner

*Primary Examiner* — Omkar A Deodhar
(74) *Attorney, Agent, or Firm* — Kirton McConkie; Evan R. Witt

(57) ABSTRACT

An AI-assisted operating system for an electronic sports game includes an input unit, a processing unit and an output unit. A current operating environment or a game scenario of playing the electronic sports game is sensed by the input unit from a perspective of an operator. The processing unit receives an information about the operating environment or the game scenario that is sensed by the input unit. After the operating environment or the game scenario is integrated and analyzed by the processing unit according to characteristics and requirements of the electronic sports game, a control command is generated. The output unit is installed in the equipment or environment for executing the electronic sports game. After the control command from the processing unit is received, the output unit prompts the operator or provides an operating message about the electronic sports game to the operator.

24 Claims, 1 Drawing Sheet

AI-ASSISTED OPERATING SYSTEM

CROSS-REFERENCE TO RELATED APPLICATION

This application claims priority to U.S. Provisional Patent Application No. 62/637,252 filed Mar. 1, 2018, the contents of which are incorporated herein by reference.

FIELD OF THE INVENTION

The present invention relates to an assisted operating system, and more particularly to an AI-assisted operating system for assisting a user in executing a computer program.

BACKGROUND OF THE INVENTION

Humans have a variety of senses. A sensory system including a visual nervous system, an auditory nervous system, an olfactory nervous system, a taste nervous system, a tactile nervous system, a vestibular nervous system and a proprioceptive nervous system is used to receive external stimuli and transmits them to the brain for integration and analysis. After tissue integration in the brain, the motor system is commanded to respond appropriately. The above process is called sensory integration.

However, when complex scenarios are faced or complex problems need to be solved, some drawbacks occur. For example, when the robotic arm is used to perform the sophisticated surgery, a complex and large computer program (e.g., an electronic sports program) is executed or various encounterable scenarios in flight simulators are simulated, relying solely on the operator's individual sensory integration ability will face certain risks. Therefore, if it is assisted by artificial intelligence (AI), many complicated tasks can be accomplished more accurately and perfectly.

Take the electronic sports game for example. As the computer screen is getting bigger and bigger, the scenes and objects are changing more and more and the amount of information displayed at the same time is more complicated. For allowing the operator to stand out in the intensely competitive game, the operator has to use the auditory sense, the visual sense and the tactile sense to the limit.

For making the game itself challenging, the game software developer certainly does not allow the operator to execute the plug-in software. In addition, the game software developer does not want the operator to give up or quit the game without being able to break through the level. Therefore, if there is an appropriate assisted operating system, it is bound to help the operator to play games or train more smoothly. Consequently, the win-win relationship between game software developer and the operator can be achieved.

SUMMARY OF THE INVENTION

The present invention provides an AI-assisted operating system with the active detecting, learning, identifying and memorizing functions. The AI-assisted operating system is capable of assisting the user to execute the complex computer program. Consequently, the complex task can be accomplished more precisely and perfectly.

In accordance with an aspect of the present invention, there is provided an AI-assisted operating system for an electronic sports game. The AI-assisted operating system includes an input unit, a processing unit and an output unit. The input unit is installed in an equipment or environment for executing the electronic sports game. A current operating environment or a game scenario of playing the electronic sports game is sensed by the input unit from a perspective of an operator. The processing unit is in cooperation with an identifying program or a driving program to receive an information about the operating environment or the game scenario that is sensed by the input unit. After the operating environment or the game scenario is integrated and analyzed by the processing unit according to characteristics and requirements of the electronic sports game, a control command is generated. The output unit is installed in the equipment or environment for executing the electronic sports game. After the control command from the processing unit is received, the output unit prompts the operator or provides an operating message about the electronic sports game to the operator.

In an embodiment, the input unit is selected from at least one of a microphone, a light sensor, a distance sensor, a gravity sensor, an accelerometer, a magnetic field sensor, a gyroscope, a heartbeat sensor, a Hall sensor, a vibration sensor and an image sensor.

In an embodiment, the input unit is installed in a headphone, a headset, a speaker, a mouse, a mouse pad, a keyboard, a joystick, a controller, a computer screen, a game accessory, a computer host, a seat, a pair of glasses, a helmet or a mobile phone.

In an embodiment, the input unit is an information capture mechanism, which retrieves required data from a computer host, a memory or a network.

In an embodiment, the processing unit is individually installed, or the processing unit is installed in a remote server, or the processing unit is integrated in the equipment or environment for executing the electronic sports game.

In an embodiment, when the processing unit is installed in the equipment or environment for executing the electronic sports game, the processing unit is installed in a headphone, a headset, a speaker, a mouse, a mouse pad, a keyboard, a joystick, a controller, a computer screen, a game accessory, a computer host, a seat, a pair of glasses, a helmet or a mobile phone.

In an embodiment, the output unit is selected from at least one of a vibrator, a buzzer, a speaker, a display screen, an indicating lamp and a scent generator.

In an embodiment, the output unit is installed in a headphone, a headset, a speaker, a mouse, a mouse pad, a keyboard, a joystick, a controller, a computer screen, an external screen, a game accessory, a computer host, a seat, a pair of glasses, a helmet or a mobile phone.

In an embodiment, the AI-assisted operating system has a function of judging which character in the electronic sports game is a stronger player by identifying the character shown on a computer screen. The input unit uses a camera module to capture a picture of the computer screen and transmits the picture of the computer screen to the processing unit. After the identifying program is executed to identify the picture of the computer screen, an identification result is generated. After the identification result is compared with a database or a new data is created, the operator is prompted through the output unit.

In an embodiment, the output unit is a vibrator that is installed in a mouse to generate specified vibration, or the output unit is an indicating lamp that is installed on a mouse pad to emit a specified flash light, or the output unit is a prompt screen where an icon representing the stronger player is shown.

In an embodiment, the AI-assisted operating system has a function of prompting whether the operator in the electronic sports game enters a bomb zone. The input unit uses a camera module to capture a picture of the computer screen and transmits the picture of the computer screen to the processing unit. After the identifying program is executed to identify whether there is a red zone on a map shown on the computer screen, the operator is prompted through the output unit.

In an embodiment, the output unit is an indicating lamp that is installed on a mouse pad to emit a specified flash light, or the output unit is a vibrator that is installed in a mouse to generate specified vibration, or the output unit is a speaker that produces a special sound effect before dropping a bomb, or the output unit is a prompt screen where a red circle or an icon representing the bomb is shown.

In an embodiment, the AI-assisted operating system has a function of identifying a relative position of a player corresponding to the operator, a position of the required equipment, positions of other players or positions of enemies on a map of the electronic sports game shown on a computer screen. The input unit uses a camera module to capture a picture of the computer screen and transmits the picture of the computer screen to the processing unit. After the identifying program is executed to identify the picture of the computer screen, the operator is prompted through the output unit.

In an embodiment, the output unit is an indicating lamp that is installed on a mouse pad to emit an upper light signal, a lower light signal, a left light signal, a right light signal, an upper left light signal, a lower left light signal, an upper right light signal or a lower right light signal to prompt the operator of the direction to go, or the output unit is a prompt screen where an outward flickering arrow signal pointing to an upper side, a lower side, a left side, a right side, an upper left side, a lower left side, an upper right side or a lower right side is shown.

In an embodiment, the AI-assisted operating system has a function of identifying and recording a trajectory of a bullet of the electronic sports game shown on a computer screen and judging orientations of enemies. The input unit uses a camera module to capture a picture of the computer screen and transmits the picture of the computer screen to the processing unit. After the identifying program is executed to identify the picture of the computer screen, the operator is prompted through the output unit.

In an embodiment, the output unit is a vibrator that is installed in a mouse to generate vibration at a specified site, or the output unit is a prompt screen where an outward flickering arrow signal pointing to at least one of an upper side, a lower side, a left side, a right side, an upper left side, a lower left side, an upper right side and a lower right side is shown.

In an embodiment, the AI-assisted operating system has a function of identifying whether there is a footstep sound, a bomb sound or a helicopter sound. The input unit uses a microphone to acquire an audio signal and transmits the audio signal to the processing unit. After the identifying program is executed to identify the audio signal, the operator is prompted through the output unit.

In an embodiment, the output unit is an indicating lamp that is installed on a mouse pad to emit a flash light at a specified frequency, or the output unit is a vibrator that is installed in a mouse to generate vibration, or the output unit is a prompt screen where an icon representing an approaching enemy, a helicopter or a supplied material is shown.

In an embodiment, the AI-assisted operating system further includes a memory unit, and a previous gaming process of a player corresponding to the operator or a game segment of another player is recorded in the memory unit. After the processing unit reads the recorded information from the memory unit, the processing unit learns attack modes of various enemies or characteristics of other players and provides recommendations through the output unit.

In an embodiment, the output unit is a prompt screen where an orientation of an enemy, a suitable attack weapon, a way to rescue a hostage or a way to remove a bomb is shown, or the output unit is an indicating lamp that outputs a light effect or prompts the operator how to move.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
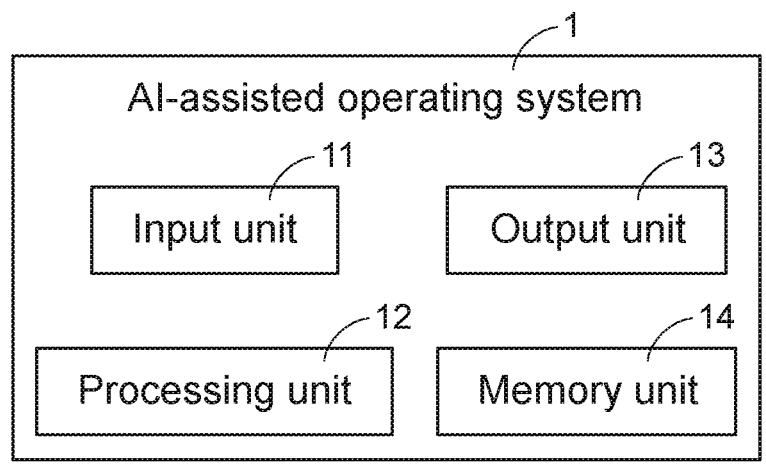
FIG. 1 is a schematic functional block diagram illustrating the architecture of an AI-assisted operating system according to an embodiment of the present invention.

The present invention provides an AI-assisted operating system. The AI-assisted operating system is used for assisting a user in executing an electronic sports program. It is noted that the applications of the AI-assisted operating system are not restricted. FIG. 1 is a schematic functional block diagram illustrating the architecture of an AI-assisted operating system according to an embodiment of the present invention. The AI-assisted operating system 1 comprises an input unit 11, a processing unit 12 and an output unit 13. These units are separate components. Moreover, these units are in communication with each other in a wired communication manner or a wireless communication manner. In some other embodiments, these units are integrated with each other according to the practical requirements. It is noted that the example of the AI-assisted operating system is not restricted. For example, a mobile phone usually comprises the input unit 11, the processing unit 12 and the output unit 13. Consequently, the mobile phone is suitably used as a part of the AI-assisted operating system. Especially, after an application program (APP) is installed in the mobile phone, the mobile phone can be served as a standalone AI-assisted operating device (system).

The input unit 11 is selected from at least one of a microphone, a light sensor, a distance sensor, a gravity sensor, an accelerometer, a magnetic field sensor, a gyroscope, a heartbeat sensor, a Hall sensor, a vibration sensor, an image sensor (e.g., a camera module) and any other appropriate sensor. The input unit may be installed in an equipment or environment for executing an electronic sports game. For example, the input unit is installed in a headphone, a headset, a speaker, a mouse, a mouse pad, a keyboard, a joystick, a controller, a computer screen, a game accessory (e.g., a steering wheel), a computer host, a seat, a pair of glasses, a helmet or a mobile phone. Consequently, the current operating environment or the scenario of playing the electronic sports game can be sensed from the perspective of the operator. Under this circumstance, it seems that the operator possesses an additional sensory system. Consequently, in the event of the complex operating environment, lacking attention or distraction, the assistance of the artificial intelligence can reduce errors or increase the ability to perform the electronic sports game. In some embodiments, the input unit 11 is also be an information capture mechanism, which retrieves required data from a computer host, a memory, a network, a wired connection device or a wireless connection device (e.g., an image outputted from the computer screen or a video or a picture from the network).

The processing unit 12 comprises a processor. With the cooperation of the processor and various identifying or driving programs, the processing unit 12 receives the information about the operating environment or the game scenario that is sensed by the input unit. After the operating environment or the game scenario is integrated and analyzed according to the characteristics and requirements of the game, the processing unit 12 generates a control command to the output unit. The processing unit may be individually installed, or installed in a remote server, or integrated in an equipment or environment for executing an electronic sports game. For example, the processing unit is installed in a headphone, a headset, a speaker, a mouse, a mouse pad, a keyboard, a joystick, a controller, a computer screen, a game accessory (e.g., a steering wheel), a computer host, a seat, a pair of glasses, a helmet or a mobile phone. Under this circumstance, it seems that the operator possesses an additional brain.

The output unit 13 is selected from a vibrator, a buzzer, a speaker, a display screen, an indicating lamp or a scent generator. The output unit in an equipment or environment for executing an electronic sports game. For example, the output unit is installed in a headphone, a headset, a speaker, a mouse, a mouse pad, a keyboard, a joystick, a controller, a computer screen, an external screen (e.g., a prompt screen), a game accessory (e.g., a steering wheel), a computer host, a seat, a pair of glasses, a helmet or a mobile phone. After the control command from the processing unit is received, the output unit prompts the user or provides the operating message about the game to the operator.

Figure 2:
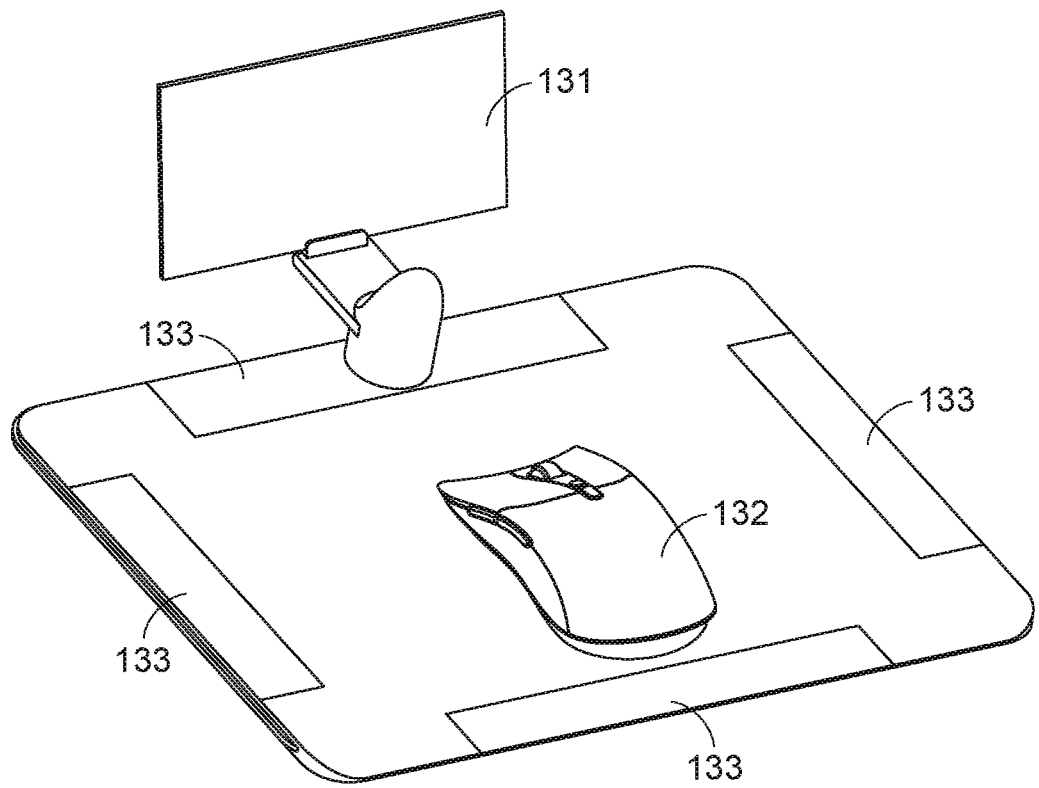
FIG. 2 schematically illustrates the hardware components of the AI-assisted operating system according to the embodiment of the present invention.

FIG. 2 schematically illustrates the hardware components of the AI-assisted operating system according to the embodiment of the present invention. In this embodiment, a mouse 132 that is widely used by the electronic sports player (i.e., the operator) is used as the carrier for installing the input unit and the output unit of the AI-assisted operating system. In addition, an output unit 133 (e.g. an indicating lamp) and a prompt screen 131 used as a carrier for output visual messages are installed on a mouse pad 131.

Hereinafter, the applications of the AI-assisted operating system on an electronic sports game will be described as examples.

For example, an electronic sports game "Playerunknown's Battlegrounds" (also referred as PUBG) one of the large-scale online multiplayer battle royale games. Since this game combines the shooting actions and the battle Royale, the player (i.e., the operator) needs to pay attention to a lot of details. Visually, the player needs to pay attention to which players around have strong ability (through identification of clothing), whether the player is about to enter the bomb zone (through identification of the red zone on the map), where to go from the current position (through identification of the relative position on the map) or which direction the player shoots (through identification of the bullet direction). Acoustically, the player needs to pay attention to whether there is a player approaching (through identification of the footsteps' sound), whether the bomb block is approaching or moving away (through identification of the bomb sound) or whether the delivered material is approaching (through identification of the helicopter sound).

When the AI-assisted operating system 1 is applied to the PUBG game, the AI-assisted operating system 1 can help the player (operator) to enhance the combat power or play the game. For example, the input unit 11 is selectively installed on a camera module of the smart glasses to capture the picture of the computer screen. In addition, the information about the picture is transmitted to a processing unit, which is also installed on the smart glasses. Moreover, two microphones are respectively installed on two lateral sides of the smart glasses to acquire the sound signals from the two lateral sides. For example, the output unit 13 includes at least one vibrator, which is located at a middle region of the mouse or installed within the two sides of the mouse. Optionally, plural indicating lamps are installed at various orientations of the mouse pad. Optionally, a speaker is installed on the smart glasses. Optionally, an additional prompt screen is provided. After the processing unit 12 receives the picture of the computer screen and the sound signals, an identification program is executed to generate an identification result. After the identification result is compared with a database or a new data is created, a control command is generated and transmitted to the output unit 13. From the above descriptions, the AI-assisted operating system 1 of the present invention can help the player (operator) to enhance the combat power or play the game. Some examples of using the AI-assisted operating system 1 to help the player to enhance the combat power or play the game will be described as follows.

Firstly, the AI-assisted operating system 1 can judge which player is the stronger player (opponent) according to the clothing of the character of the electronic sports game shown on the computer screen. In addition, the AI-assisted operating system 1 converts the identification result into a vibration command, and transmits the vibration command to the vibrator within the mouse 132. Consequently, the vibrator generates specified vibration. Alternatively, the AI-assisted operating system 1 converts the identification result into a lamp command, and transmits the lamp command to the indicating lamp 133 on the mouse pad. Consequently, the indicating lamp 133 emits a specified flash light. Alternatively, the AI-assisted operating system 1 converts the identification result into an image command, and transmits the image command to the prompt screen 131. Consequently, an icon representing a super strong or stronger player (opponent) is shown on the prompt screen 131.

Secondly, the AI-assisted operating system 1 prompts whether the operator in the electronic sports game picture has entered the bomb zone by judging whether there is a red zone on the map of the electronic sports game shown on the computer screen. In addition, the AI-assisted operating system 1 converts the identification result into a lamp command, and transmits the lamp command to the indicating lamp 133 on the mouse pad. Consequently, the indicating lamp 133 emits a specified flash light (e.g., a red flash light) to prompt the player (operator) that the player has entered or is about to enter the bomb zone. Alternatively, the AI-assisted operating system 1 converts the identification result into a vibration command, and transmits the vibration command to the vibrator within the mouse 132. Consequently, the player senses strong vibration. Alternatively, the AI-assisted operating system 1 converts the identification result into an audio signal, and transmits the audio signal to the speaker of the smart glasses. Consequently, a special sound effect before dropping a bomb is produced. Alternatively, the AI-assisted operating system 1 converts the identification result into an image command, and transmits the image command to the prompt screen 131. Consequently, a red circle or an icon representing a bomb is shown on the prompt screen 131.

Thirdly, the AI-assisted operating system 1 identifies the relative position of the player, the position of the required equipment, the positions of other players or the position of the enemy on the map of the electronic sports game shown on the computer screen. In addition, the AI-assisted operating system 1 converts the identification result into a lamp command, and transmits the lamp command to the corresponding indicating lamp 133 on the mouse pad. Consequently, the corresponding indicating lamp 133 emits an upper light signal, a lower light signal, a left light signal, a right light signal, an upper left light signal, a lower left light signal, an upper right light signal or a lower right light signal in order to prompt the operator (player) of the direction to go. Alternatively, the AI-assisted operating system 1 converts the identification result into an image command, and transmits the image command to the prompt screen 131. Consequently, an outward flickering arrow signal pointing to an upper side, a lower side, a left side, a right side, an upper left side, a lower left side, an upper right side or a lower right side is shown on the prompt screen 131.

Fourthly, the AI-assisted operating system 1 identifies and records the trajectory of the bullet of the electronic sports game shown on the computer screen and judges the orientation of the enemy. In addition, the AI-assisted operating system 1 converts the identification result into a vibration command, and transmits the vibration command to the vibrator within the mouse 132. Consequently, the vibrator generates vibration at a specified site. Alternatively, the AI-assisted operating system 1 converts the identification result into a lamp command, and transmits the lamp command to the indicating lamp 133 on the mouse pad. Consequently, the indicating lamp 133 emits a specified flash light. Alternatively, the AI-assisted operating system 1 converts the identification result into an image command, and transmits the image command to the prompt screen 131. Consequently, an inward flickering arrow signal pointing to at least one of an upper side, a lower side, a left side, a right side, an upper left side, a lower left side, an upper right side and a lower right side is shown on the prompt screen 131.

Fifthly, the AI-assisted operating system 1 identifies the audio signal of the electronic sports game that is outputted from the computer speaker and judges whether there is a footstep sound, a bomb sound, a helicopter sound or any specified sound effect. After the identification result from the processing unit 12 is converted into a lamp command, the lamp command is transmitted to the indicating lamp 133 on the mouse pad. Consequently, the indicating lamp 133 emits a flash light (e.g., a green flash light) at a specified frequency so as to prompt the player that the player has moved away from the bomb zone or a helicopter is approaching and delivering the material. Alternatively, the AI-assisted operating system 1 converts the identification result into a vibration command, and transmits the vibration command to the vibrator within the mouse 132. The operator senses the strong vibration, and thus the operator realizes that the bomb is being bombed and needs to be avoided immediately. Alternatively, the AI-assisted operating system 1 converts the identification result into an image command, and transmits the image command to the prompt screen 131. Consequently, an icon representing the approaching enemy, a helicopter or a supplied material is shown on the prompt screen 131.

The examples of using the AI-assisted operating system 1 to help the player to enhance the combat power or play the game have been mentioned as above. It is noted that the player can set various output units and identifying programs according to the practical requirements or habits.

In the above embodiments, the AI-assisted operating system allows the player to have a second sensory system and a second brain, so that the player has a helper. Moreover, after a self-learning process, the AI-assisted operating system also has a role similar to a coach or a consultant.

For example, "Counter-Strike" (also referred as CS) is an online electronic sports game. As the difficulty level of the game increases, the sight of the enemy is more accurate and the enemy acts more swiftly. The way of passively providing the prompt to the player cannot meet the needs of the player. More preferably, the AI-assisted operating system of the present invention also has the active learning function and the active prompting function. For example, the AI-assisted operating system further comprises a memory unit 14, or the AI-assisted operating system is in communication with a memory unit 14. The previous gaming process of the player or the game segments of other players referred or searched from the network are recorded in the memory unit 14. After the processing unit 12 reads the recorded information from the memory unit 14, the processing unit 12 actively learns the attack modes of various enemies or the characteristics of other players and actively provides recommendations through the output unit according to the differences. For example, after the AI-assisted operating system learns the shooting and operating modes of the operator and identifies and predicts the orientation of the enemy or the possible fired position of the bullet, the prompt is previously made through the output unit. For example, the orientation of the enemy, the suitable attack weapon, the way to rescue the hostage or the way to remove the bomb is shown on the prompt screen, or the indicating lamp outputs the light effect or prompts the player (operator) how to move.

From the above descriptions, the present invention provides AI-assisted operating system. The AI-assisted operating system has the active learning capability. Moreover, the AI-assisted operating system can also be used for judging the scenario and integrating the information so as to provide more comprehensive recommendations. For example, when the player concentrates on the game, too many prompts may influence the player's concentration, or the prompts at any time may also cause the player to lose the motivation and space for improvement. After the AI-assisted operating system integrates the information and predicts the possible development in the future, the AI-assisted operating system creates the priority order. The most important or critical information is selected to be provided to the player, or the prompt is selected at the most critical time point. Since the user's attention is only placed on the content that requires the most attention, the user can enjoy the fun of the game.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An AI-assisted operating system for an electronic sports game, the AI-assisted operating system comprising:

an input unit installed in an equipment or environment for executing the electronic sports game, wherein a current operating environment or a game scenario of playing the electronic sports game is sensed by the input unit from a perspective of an operator;

a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;

an output unit installed in the equipment or environment for executing the electronic sports game, wherein after the control command from the processing unit is received, the output unit prompts the operator or provides an operating message about the electronic sports game to the operator; and a memory unit, and a previous gaming process of a player corresponding to the operator or a game segment of another player is recorded in the memory unit, wherein after the processing unit reads the recorded information from the memory unit, the processing unit learns attack modes of various enemies or characteristics of other players and provides recommendations through the output unit.

2. The AI-assisted operating system according to claim 1, wherein the input unit is selected from at least one of a microphone, a light sensor, a distance sensor, a gravity sensor, an accelerometer, a magnetic field sensor, a gyroscope, a heartbeat sensor, a Hall sensor, a vibration sensor and an image sensor.

3. The AI-assisted operating system according to claim 1, wherein the input unit is installed in a headphone, a headset, a speaker, a mouse, a mouse pad, a keyboard, a joystick, a controller, a computer screen, a game accessory, a computer host, a seat, a pair of glasses, a helmet or a mobile phone.

4. The AI-assisted operating system according to claim 1, wherein the input unit is an information capture mechanism, which retrieves required data from a computer host, a memory or a network.

5. The AI-assisted operating system according to claim 1, wherein the processing unit is individually installed, or the processing unit is installed in a remote server, or the processing unit is integrated in the equipment or environment for executing the electronic sports game.

6. The AI-assisted operating system according to claim 5, wherein when the processing unit is installed in the equipment or environment for executing the electronic sports game, the processing unit is installed in a headphone, a headset, a speaker, a mouse, a mouse pad, a keyboard, a joystick, a controller, a computer screen, a game accessory, a computer host, a seat, a pair of glasses, a helmet or a mobile phone.

7. The AI-assisted operating system according to claim 1, wherein the output unit is selected from at least one of a vibrator, a buzzer, a speaker, a display screen, an indicating lamp and a scent generator.

8. The AI-assisted operating system according to claim 1, wherein the output unit is installed in a headphone, a headset, a speaker, a mouse, a mouse pad, a keyboard, a joystick, a controller, a computer screen, an external screen, a game accessory, a computer host, a seat, a pair of glasses, a helmet or a mobile phone.

9. The AI-assisted operating system according to claim 1, wherein the AI-assisted operating system has a function of judging which character in the electronic sports game is a stronger player by identifying the character shown on a computer screen, wherein the input unit uses a camera module to capture a picture of the computer screen and transmits the picture of the computer screen to the processing unit, wherein after the identifying program is executed to identify the picture of the computer screen, an identification result is generated, wherein after the identification result is compared with a database or a new data is created, the operator is prompted through the output unit.

10. The AI-assisted operating system according to claim 9, wherein the output unit is a vibrator that is installed in a mouse to generate specified vibration, or the output unit is an indicating lamp that is installed on a mouse pad to emit a specified flash light, or the output unit is a prompt screen where an icon representing the stronger player is shown.

11. The AI-assisted operating system according to claim 1, wherein the AI-assisted operating system has a function of prompting whether the operator in the electronic sports game enters a bomb zone, wherein the input unit uses a camera module to capture a picture of the computer screen and transmits the picture of the computer screen to the processing unit, wherein after the identifying program is executed to identify whether there is a red zone on a map shown on the computer screen, the operator is prompted through the output unit.

12. The AI-assisted operating system according to claim 11, wherein the output unit is an indicating lamp that is installed on a mouse pad to emit a specified flash light, or the output unit is a vibrator that is installed in a mouse to generate specified vibration, or the output unit is a speaker that produces a special sound effect before dropping a bomb, or the output unit is a prompt screen where a red circle or an icon representing the bomb is shown.

13. The AI-assisted operating system according to claim 1, wherein the AI-assisted operating system has a function of identifying a relative position of a player corresponding to the operator, a position of the required equipment, positions of other players or positions of enemies on a map of the electronic sports game shown on a computer screen, wherein the input unit uses a camera module to capture a picture of the computer screen and transmits the picture of the computer screen to the processing unit, wherein after the identifying program is executed to identify the picture of the computer screen, the operator is prompted through the output unit.

14. The AI-assisted operating system according to claim 13, wherein the output unit is an indicating lamp that is installed on a mouse pad to emit an upper light signal, a lower light signal, a left light signal, a right light signal, an upper left light signal, a lower left light signal, an upper right light signal or a lower right light signal to prompt the operator of the direction to go, or the output unit is a prompt screen where an outward flickering arrow signal pointing to an upper side, a lower side, a left side, a right side, an upper left side, a lower left side, an upper right side or a lower right side is shown.

15. The AI-assisted operating system according to claim 1, wherein the AI-assisted operating system has a function of identifying and recording a trajectory of a bullet of the electronic sports game shown on a computer screen and judging orientations of enemies, wherein the input unit uses a camera module to capture a picture of the computer screen and transmits the picture of the computer screen to the processing unit, wherein after the identifying program is executed to identify the picture of the computer screen, the operator is prompted through the output unit.

16. The AI-assisted operating system according to claim 15, wherein the output unit is a vibrator that is installed in a mouse to generate vibration at a specified site, or the output unit is a prompt screen where an outward flickering arrow signal pointing to at least one of an upper side, a lower side, a left side, a right side, an upper left side, a lower left side, an upper right side and a lower right side is shown.

17. The AI-assisted operating system according to claim 1, wherein the AI-assisted operating system has a function of identifying whether there is a footstep sound, a bomb sound or a helicopter sound, wherein the input unit uses a microphone to acquire an audio signal and transmits the audio signal to the processing unit, wherein after the identifying program is executed to identify the audio signal, the operator is prompted through the output unit.

18. The AI-assisted operating system according to claim 17, wherein the output unit is an indicating lamp that is installed on a mouse pad to emit a flash light at a specified frequency, or the output unit is a vibrator that is installed in a mouse to generate vibration, or the output unit is a prompt screen where an icon representing an approaching enemy, a helicopter or a supplied material is shown.

19. The AI-assisted operating system according to claim 1, wherein the output unit is a prompt screen where an orientation of an enemy, a suitable attack weapon, a way to rescue a hostage or a way to remove a bomb is shown, or the output unit is an indicating lamp that outputs a light effect or prompts the operator how to move.

20. An AI-assisted operating system for an electronic sports game, the AI-assisted operating system comprising:
an input unit installed in an equipment or environment for executing the electronic sports game, wherein a current operating environment or a game scenario of playing the electronic sports game is sensed by the input unit from a perspective of an operator;
a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;
an output unit installed in the equipment or environment for executing the electronic sports game, wherein after the control command from the processing unit is received, the output unit prompts the operator or provides an operating message about the electronic sports game to the operator,
wherein the AI-assisted operating system has a function of judging which character in the electronic sports game is a stronger player by identifying the character shown on a computer screen, wherein the input unit uses a camera module to capture a picture of the computer screen and transmits the picture of the computer screen to the processing unit, wherein after the identifying program is executed to identify the picture of the computer screen, an identification result is generated, wherein after the identification result is compared with a database or a new data is created, the operator is prompted through the output unit.

21. An AI-assisted operating system for an electronic sports game, the AI-assisted operating system comprising:
an input unit installed in an equipment or environment for executing the electronic sports game, wherein a current operating environment or a game scenario of playing the electronic sports game is sensed by the input unit from a perspective of an operator;
a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;
an output unit installed in the equipment or environment for executing the electronic sports game, wherein after the control command from the processing unit is received, the output unit prompts the operator or provides an operating message about the electronic sports game to the operator,
wherein the AI-assisted operating system has a function of prompting whether the operator in the electronic sports game enters a bomb zone, wherein the input unit uses a camera module to capture a picture of the computer screen and transmits the picture of the computer screen to the processing unit, wherein after the identifying program is executed to identify whether there is a red zone on a map shown on the computer screen, the operator is prompted through the output unit.

22. An AI-assisted operating system for an electronic sports game, the AI-assisted operating system comprising:
an input unit installed in an equipment or environment for executing the electronic sports game, wherein a current operating environment or a game scenario of playing the electronic sports game is sensed by the input unit from a perspective of an operator;
a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;
an output unit installed in the equipment or environment for executing the electronic sports game, wherein after the control command from the processing unit is received, the output unit prompts the operator or provides an operating message about the electronic sports game to the operator,
wherein the AI-assisted operating system has a function of identifying a relative position of a player corresponding to the operator, a position of the required equipment, positions of other players or positions of enemies on a map of the electronic sports game shown on a computer screen, wherein the input unit uses a camera module to capture a picture of the computer screen and transmits the picture of the computer screen to the processing unit, wherein after the identifying program is executed to identify the picture of the computer screen, the operator is prompted through the output unit.

23. An AI-assisted operating system for an electronic sports game, the AI-assisted operating system comprising:
an input unit installed in an equipment or environment for executing the electronic sports game, wherein a current operating environment or a game scenario of playing the electronic sports game is sensed by the input unit from a perspective of an operator;
a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;

an output unit installed in the equipment or environment for executing the electronic sports game, wherein after the control command from the processing unit is received, the output unit prompts the operator or provides an operating message about the electronic sports game to the operator, wherein the AI-assisted operating system has a function of identifying and recording a trajectory of a bullet of the electronic sports game shown on a computer screen and judging orientations of enemies, wherein the input unit uses a camera module to capture a picture of the computer screen and transmits the picture of the computer screen to the processing unit, wherein after the identifying program is executed to identify the picture of the computer screen, the operator is prompted through the output unit.

24. An AI-assisted operating system for an electronic sports game, the AI-assisted operating system comprising:

an input unit installed in an equipment or environment for executing the electronic sports game, wherein a current operating environment or a game scenario of playing the electronic sports game is sensed by the input unit from a perspective of an operator;

a processing unit in cooperation with an identifying program or a driving program to receive an information about the operating environment or the game scenario that is sensed by the input unit, wherein after the operating environment or the game scenario is integrated and analyzed by the processing unit according to characteristics and requirements of the electronic sports game, a control command is generated;

an output unit installed in the equipment or environment for executing the electronic sports game, wherein after the control command from the processing unit is received, the output unit prompts the operator or provides an operating message about the electronic sports game to the operator, wherein the AI-assisted operating system has a function of identifying whether there is a footstep sound, a bomb sound or a helicopter sound, wherein the input unit uses a microphone to acquire an audio signal and transmits the audio signal to the processing unit, wherein after the identifying program is executed to identify the audio signal, the operator is prompted through the output unit.

* * * * *